K. I. LINDSTRÖM.
MILK VESSEL FOR MILKING MACHINES WORKING WITH VACUUM.
APPLICATION FILED MAR. 9, 1916.
1,210,818.                                              Patented Jan. 2, 1917.
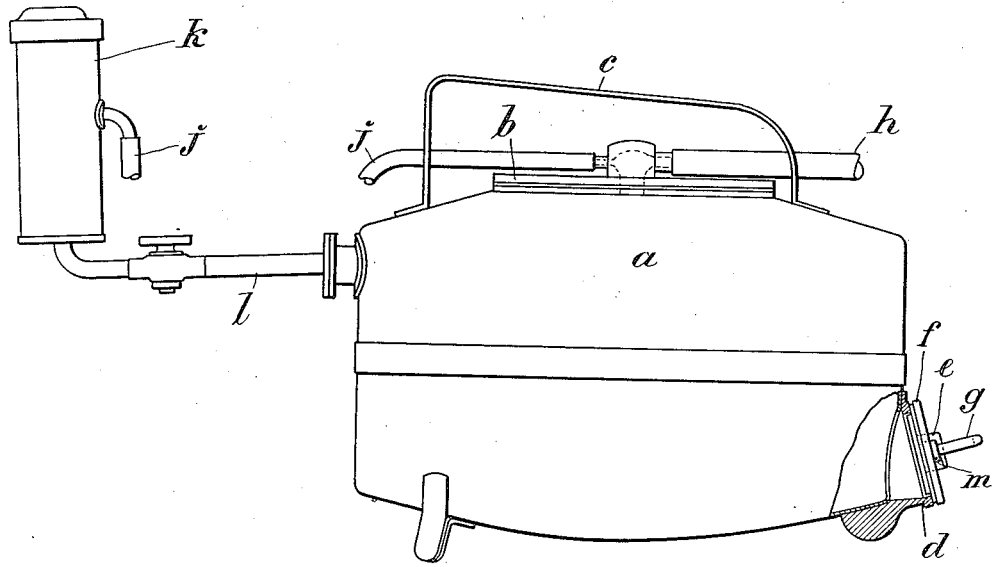
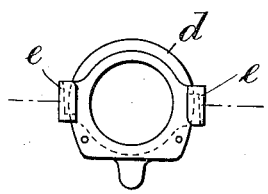 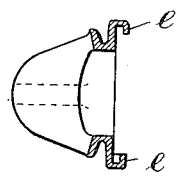
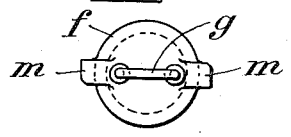
Inventor
Knut Ivar Lindström
By
B. Singer  Attorneys

UNITED STATES PATENT OFFICE.

KNUT IVAR LINDSTRÖM, OF DJURSHOLM, SWEDEN, ASSIGNOR TO AKTIEBOLAGET MJÖLKNINGSMASKIN OMEGA, OF FLEN, SWEDEN.

MILK VESSEL FOR MILKING-MACHINES WORKING WITH VACUUM.

1,210,818.  Specification of Letters Patent. Patented Jan. 2, 1917.

Application filed March 9, 1916. Serial No. 83,152.

*To all whom it may concern:*

Be it known that I, KNUT IVAR LINDSTRÖM, estate-owner, a subject of the King of Sweden, residing at Djursholm, Sweden, have invented certain new and useful Improvements in Milk Vessels for Milking-Machines Working with Vacuum, of which the following is a specification.

In milk vessels for such milking machines as work with vacuum and where the milk is sucked into a collecting vessel in which a vacuum is prevailing, one has generally made use of the cover fitted on the upper part of the vessel for emptying the milk from the milk vessel after the milking has been performed. The chief purpose of the cover is, however, to provide an access to the interior of the milk vessel for cleaning purposes.

In order to facilitate the emptying of the milk from the milk vessel, also when this latter is mounted on the cow, there is, according to the present invention provided an opening at or close to the bottom of the milk vessel which opening is closed by a cover that partly is held pressed against the edge of the opening on account of the vacuum prevailing in the milk vessel, and partly is secured in position by means of lugs, a bayonet clutch, threads, or similar devices.

A milk vessel in accordance with the invention is shown in side view in Figure 1 of the annexed drawing. Figs. 2 and 3 show in detail the socket forming the seat of the lower cover. Fig. 4 shows the cover in detail.

$a$ is the milk vessel, $b$ its upper cover, held in position by its own weight and, during the milking process, also on account of the vacuum prevailing in the vessel.

$c$ is a handle arranged over the cover. $h$ is the hose leading from the sucking pump to the interior of the vessel and $j$ indicates the hose, by which the interior of the vessel communicates with the outer chamber of the teatcup $k$ and in which is inserted a pulsator adapted to cause alternately a vacuum and alternately an atmospheric pressure in the outer chamber of the teatcup $k$ in known manner.

$l$ indicates the milk conduit between the vessel and the inner chamber of the teatcup.

$d$ is the said socket fitted near the bottom of the vessel and provided with two projections, ears or lugs $e$ engaging projections $m$ on the cover $f$ so as to secure this latter in position. It will be understood from the drawing that the cover $f$ is secured and loosened by rotating it around its center. The cover $f$ is provided with a handle $g$. The arrangement is such, that, when the cover is rotated so as to cause the projections $m$ to engage the lugs $e$, it is also pressed against the opening of the flanged socket $d$. The inner surfaces of the lugs $e$ are respectively somewhat inclined as shown in Fig. 1. During the milking process the cover is besides, pressed against the opening of the socket $d$ on account of the exterior overpressure.

Having now described and ascertained the nature of my said invention what I claim is:

In a milking apparatus in combination, a combined vacuum and milking vessel having an opening at the top and a second opening close to the bottom of the vessel, and a cover for each of said openings, said vessel and the cover for the second opening having inter-engaging members for holding the same in position over said second opening, said cover being pressed against the mouth of said second opening during the milking process on account of the vacuum prevailing in the vessel.

In testimony whereof I affix my signature in presence of two witnesses.

KNUT IVAR LINDSTRÖM.

Witnesses:
 ELIN WAHMAN,
 FRANK LYON.